US012067958B2

(12) United States Patent
Wang

(10) Patent No.: US 12,067,958 B2
(45) Date of Patent: Aug. 20, 2024

(54) MURA COMPENSATION METHOD OF DISPLAY PANEL AND DISPLAY PANEL

(71) Applicant: Wuhan China Star Optoelectronics Semiconductor Display Technology Co., Ltd., Hubei (CN)

(72) Inventor: Yedong Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,616

(22) PCT Filed: Dec. 20, 2021

(86) PCT No.: PCT/CN2021/139565
§ 371 (c)(1),
(2) Date: Dec. 29, 2021

(87) PCT Pub. No.: WO2023/108672
PCT Pub. Date: Jun. 22, 2023

(65) Prior Publication Data

US 2024/0038198 A1 Feb. 1, 2024

(30) Foreign Application Priority Data

Dec. 14, 2021 (CN) ......................... 202111526859.2

(51) Int. Cl.
*G09G 5/10* (2006.01)

(52) U.S. Cl.
CPC ....... *G09G 5/10* (2013.01); *G09G 2320/0233* (2013.01); *G09G 2320/0271* (2013.01); *G09G 2360/16* (2013.01)

(58) Field of Classification Search
CPC ............. G09G 5/10; G09G 2320/0271; G09G 2320/0233; G09G 2360/16
See application file for complete search history.

(56) References Cited

U.S. PATENT DOCUMENTS

2011/0234644 A1* 9/2011 Park .......................... G09G 5/10 345/690
2014/0320521 A1* 10/2014 Oh ....................... G09G 3/3648 345/601
2019/0139470 A1 5/2019 Yoo et al.
2019/0371268 A1 12/2019 Lee et al.
(Continued)

FOREIGN PATENT DOCUMENTS

CN 108694906 10/2018
CN 108932931 12/2018
(Continued)

*Primary Examiner* — Muhammad N Edun

(57) ABSTRACT

A mura compensation method of a display panel and a display panel are provided. The display panel includes a display area. The display area includes a regular display sub-area and a function display sub-area. The mura compensation method of the display panel includes: performing an initial compensation for each pixel unit in the display area; acquiring an actual grayscale value and an actual brightness value of each pixel unit in the function display sub-area; and determining a secondary compensation value of each pixel unit in the function display sub-area and performing a secondary compensation.

16 Claims, 3 Drawing Sheets

(56) References Cited

U.S. PATENT DOCUMENTS

| | | | | |
|---|---|---|---|---|
| 2019/0378474 | A1* | 12/2019 | Kuo | G09G 3/3208 |
| 2020/0168139 | A1* | 5/2020 | Lee | G09G 3/3611 |

FOREIGN PATENT DOCUMENTS

| | | |
|---|---|---|
| CN | 110532972 | 12/2019 |
| CN | 111816121 | 10/2020 |
| CN | 111833794 | 10/2020 |
| CN | 112863421 | 5/2021 |
| CN | 113140196 | 7/2021 |

* cited by examiner

MURA COMPENSATION METHOD OF DISPLAY PANEL AND DISPLAY PANEL

RELATED APPLICATIONS

This application is a National Phase of PCT Patent Application No. PCT/CN2021/139565 having International filing date of Dec. 20, 2021, which claims the benefit of priority of Chinese Patent Application No. 202111526859.2 filed on Dec. 14, 2021. The contents of the above applications are all incorporated by reference as if fully set forth herein in their entirety.

FIELD AND BACKGROUND OF THE INVENTION

The present disclosure relates to the field of display driving technologies, and in particular to a compensation method of a display panel and a display panel.

With the development of communication technologies, electronic devices such as smart phones are becoming more and more popular. Display panels are also developing in a direction of a full screen.

At present, in order to achieve a true full screen, current mobile phone manufacturers are actively developing under-screen camera technology, that is a front camera is arranged below the screen. In order to ensure a light transmittance of an imaging area of a display panel, the imaging area needs to adopt a design scheme different from other display area. Each pixel in the imaging area is much smaller than other pixels in the display area to reduce the influence on the amount of light entering. At the same time, drive circuits under the pixels are is moved to an outside of the imaging area to further increase the amount of light entering. Finally, leads connecting the pixel and the driving circuits are modified to a transparent material. Also, a traditional straight lead is changed to a curve, and it can be arranged around a camera area to avoid diffraction effects on light and affect a photographing effect.

However, distances between transparent anode leads and the driving circuits are different. The pixels outside the imaging area correspond to shorter leads. The closer to the center, the longer the lead of the pixel. Thus, under low brightness, a load difference between the two is obvious, and it is easy to cause a bright ring at an edge of the imaging area, which will affect the display effect.

SUMMARY OF THE INVENTION

Embodiments of the present disclosure provide a compensation method of a display panel and a display panel, which can effectively improve a display unevenness that occurs in a photosensitive area of the display panel.

An embodiment of the present disclosure provides a mura compensation method of a display panel, the display panel including a display area, the display area including a regular display sub-area and a function display sub-area adjacent to the regular display sub-area, and the mura compensation method of the display panel including:

acquiring a target brightness value of each pixel unit in the display panel and a target voltage value corresponding to the target brightness value, and performing an initial compensation for each pixel unit;

acquiring an actual grayscale value and an actual brightness value of each pixel unit in the function display sub-area; and determining a secondary compensation value of each pixel unit in the function display sub-area according to the target brightness value, the actual grayscale value, and the actual brightness value of each pixel unit in the function display sub-area, and performing a secondary compensation for each pixel unit in the function display sub-area.

In one embodiment of the present disclosure, the steps of determining the secondary compensation value of each pixel unit in the function display sub-area according to the target brightness value, the actual grayscale value, and the actual brightness value of each pixel unit in the function display sub-area, and performing the secondary compensation for each pixel unit in the function display sub-area include:

determining a compensation factor of each pixel unit in the function display sub-area according to the target brightness value, the actual brightness value, and the actual grayscale value of each pixel unit in the function display sub-area;

determining a compensation base of each pixel unit in the function display sub-area according to the target brightness value, the actual brightness value, and the actual grayscale value of each pixel unit in the function display sub-area; and determining the secondary compensation value of each pixel unit in the function display sub-area according to the compensation factor and the compensation base of each pixel unit in the function display sub-area.

In one embodiment of the present disclosure, the step of determining the compensation factor of each pixel unit in the function display sub-area according to the target brightness value, the actual brightness value, and the actual grayscale value of each pixel unit in the function display sub-area includes:

if the target brightness value is less than or equal to a preset brightness threshold, determining the compensation factor of each pixel unit in the function display sub-area in a compensation factor database according to the actual brightness value and the actual grayscale value of each pixel unit in the function display sub-area, wherein the compensation factor database includes a plurality sets of optical parameters, and one of the sets of the optical parameters corresponds to one compensation factor.

In one embodiment of the present disclosure, the preset brightness threshold is 200 nit.

In one embodiment of the present disclosure, each set of the optical parameters includes a preset brightness value and a preset grayscale value.

In one embodiment of the present disclosure, the step of determining the compensation factor of each pixel unit in the function display sub-area according to the target brightness value, the actual brightness value, and the actual grayscale value of each pixel unit in the function display sub-area further includes:

if the target brightness value is greater than the preset brightness threshold, the compensation factor of each pixel unit in the function display sub-area is zero.

In one embodiment of the present disclosure, the preset brightness threshold is 200 nit.

In one embodiment of the present disclosure, in the step of determining the compensation base of each pixel unit in the function display sub-area according to the target brightness value, the actual brightness value, and the actual grayscale value of each pixel unit in the function display sub-area, a formula for determining the compensation base of each pixel unit in the function display sub-area according to the target brightness value, the actual brightness value, and the actual grayscale value of each pixel unit in the function display sub-area is:

$$N=\left(e^{\frac{1}{2.2}\ln\frac{A}{B}}-1\right)C$$

wherein N is the compensation base of each pixel unit in the function display sub-area, A is the target brightness value of each pixel unit in the function display sub-area, B is the actual brightness value of each pixel unit in the function display sub-area, and C is the actual grayscale value of each pixel unit in the function display sub-area.

In one embodiment of the present disclosure, in the step of determining the secondary compensation value of each pixel unit in the function display sub-area according to the compensation factor and the compensation base of each pixel unit in the function display sub-area, a formula for determining the secondary compensation value of each pixel unit in the function display sub-area according to the compensation factor and the compensation base of each pixel unit in the function display sub-area is:

$$M=NX$$

wherein M is the secondary compensation value of each pixel unit in the function display sub-area, N is the compensation base of each pixel unit in the function display sub-area, and X is the compensation factor of each pixel unit in the function display sub-area.

In one embodiment of the present disclosure, the steps of acquiring the target brightness value of each pixel unit in the display panel and the target voltage value corresponding to the target brightness value, and performing the initial compensation for each pixel unit include:

acquiring an initial voltage value of each pixel unit received by the display panel and an initial brightness value corresponding to the initial voltage value; and acquiring an initial compensation value of each pixel unit according to the initial voltage value, the initial brightness value, the target brightness value, and the target voltage value of each pixel unit in the display panel, and performing the initial compensation for each pixel unit.

According to the above-mentioned object of the present disclosure, a mura compensation method of a display panel is further provided, the display panel including a display area, the display area including a regular display sub-area and a function display sub-area adjacent to the regular display sub-area, and the mura compensation method of the display panel including:

acquiring a target brightness value of each pixel unit in the display panel and a target voltage value corresponding to the target brightness value, and performing an initial compensation for each pixel unit;

acquiring an actual grayscale value and an actual brightness value of each pixel unit in the function display sub-area; and determining a secondary compensation value of each pixel unit in the function display sub-area according to the target brightness value, the actual grayscale value, and the actual brightness value of each pixel unit in the function display sub-area, and performing a secondary compensation for each pixel unit in the function display sub-area;

wherein the step performing the secondary compensation for each pixel unit in the function display sub-area includes steps of:

determining a compensation factor of each pixel unit in the function display sub-area according to the target brightness value, the actual brightness value, and the actual grayscale value of each pixel unit in the function display sub-area;

determining a compensation base of each pixel unit in the function display sub-area according to the target brightness value, the actual brightness value, and the actual grayscale value of each pixel unit in the function display sub-area; and determining the secondary compensation value of each pixel unit in the function display sub-area according to the compensation factor and the compensation base of each pixel unit in the function display sub-area.

In one embodiment of the present disclosure, the step of determining the compensation factor of each pixel unit in the function display sub-area according to the target brightness value, the actual brightness value, and the actual grayscale value of each pixel unit in the function display sub-area includes:

if the target brightness value is less than or equal to a preset brightness threshold, determining the compensation factor of each pixel unit in the function display sub-area in a compensation factor database according to the actual brightness value and the actual grayscale value of each pixel unit in the function display sub-area, wherein the compensation factor database includes a plurality sets of optical parameters, and one of the sets of the optical parameters corresponds to one compensation factor.

In one embodiment of the present disclosure, each set of the optical parameters includes a preset brightness value and a preset grayscale value.

In one embodiment of the present disclosure, the step of determining the compensation factor of each pixel unit in the function display sub-area according to the target brightness value, the actual brightness value, and the actual grayscale value of each pixel unit in the function display sub-area further includes:

if the target brightness value is greater than the preset brightness threshold, the compensation factor of each pixel unit in the function display sub-area is zero.

In one embodiment of the present disclosure, the preset brightness threshold is 200 nit.

In one embodiment of the present disclosure, in the step of determining the compensation base of each pixel unit in the function display sub-area according to the target brightness value, the actual brightness value, and the actual grayscale value of each pixel unit in the function display sub-area, a formula for determining the compensation base of each pixel unit in the function display sub-area according to the target brightness value, the actual brightness value, and the actual grayscale value of each pixel unit in the function display sub-area is:

$$N=\left(e^{\frac{1}{2.2}\ln\frac{A}{B}}-1\right)C$$

wherein N is the compensation base of each pixel unit in the function display sub-area, A is the target brightness value of each pixel unit in the function display sub-area, B is the actual brightness value of each pixel unit in the function display sub-area, and C is the actual grayscale value of each pixel unit in the function display sub-area.

In one embodiment of the present disclosure, in the step of determining the secondary compensation value of each pixel unit in the function display sub-area according to the compensation factor and the compensation base of each pixel unit in the function display sub-area, a formula for determining the secondary compensation value of each pixel unit in the function display sub-area according to the compensation factor and the compensation base of each pixel unit in the function display sub-area is:

$$M=NX$$

wherein M is the secondary compensation value of each pixel unit in the function display sub-area, N is the compensation base of each pixel unit in the function display sub-area, and X is the compensation factor of each pixel unit in the function display sub-area.

In one embodiment of the present disclosure, the steps of acquiring the target brightness value of each pixel unit in the display panel and the target voltage value corresponding to the target brightness value, and performing the initial compensation for each pixel unit include:

acquiring an initial voltage value of each pixel unit received by the display panel and an initial brightness value corresponding to the initial voltage value; and acquiring an initial compensation value of each pixel unit according to the initial voltage value, the initial brightness value, the target brightness value, and the target voltage value of each pixel unit in the display panel, and performing the initial compensation for each pixel unit.

According to the above-mentioned object of the present disclosure, a display panel is further provided, including a display area, wherein the display area includes a regular display sub-area and a function display sub-area adjacent to the regular display sub-area, the function display sub-area includes a middle area and an annular bright area surrounding the middle area;

the display panel includes a first pixel unit disposed in the annular bright area and a second pixel unit disposed in the middle area; and in response to a brightness of the first pixel unit being the same as a brightness of the second pixel unit, a driving voltage applied to the first pixel unit is higher than a driving voltage applied to the second pixel unit.

In one embodiment of the present disclosure, the driving voltage applied to the first pixel unit is greater than or equal to 1V and less than or equal to 6.8V; and the driving voltage applied to the second pixel unit is greater than or equal to 1V and less than or equal to 6.8V.

In comparison with the prior art, the present disclosure performs the secondary compensation for the pixel unit in the function display sub-area after performing the initial compensation for the display panel. Its improves that in the function display sub-area of the display panel, due to different lengths of anode leads, a load difference is large and it is easy to cause a bright ring. A display uniformity of the display panel is increased.

BRIEF DESCRIPTION OF THE SEVERAL VIEWS OF THE DRAWINGS

The following describes specific embodiments of the present disclosure in detail with reference to the accompanying drawings to make technical solutions and other beneficial effects of the present disclosure obvious.

DESCRIPTION OF SPECIFIC EMBODIMENTS OF THE INVENTION

Figure 1:
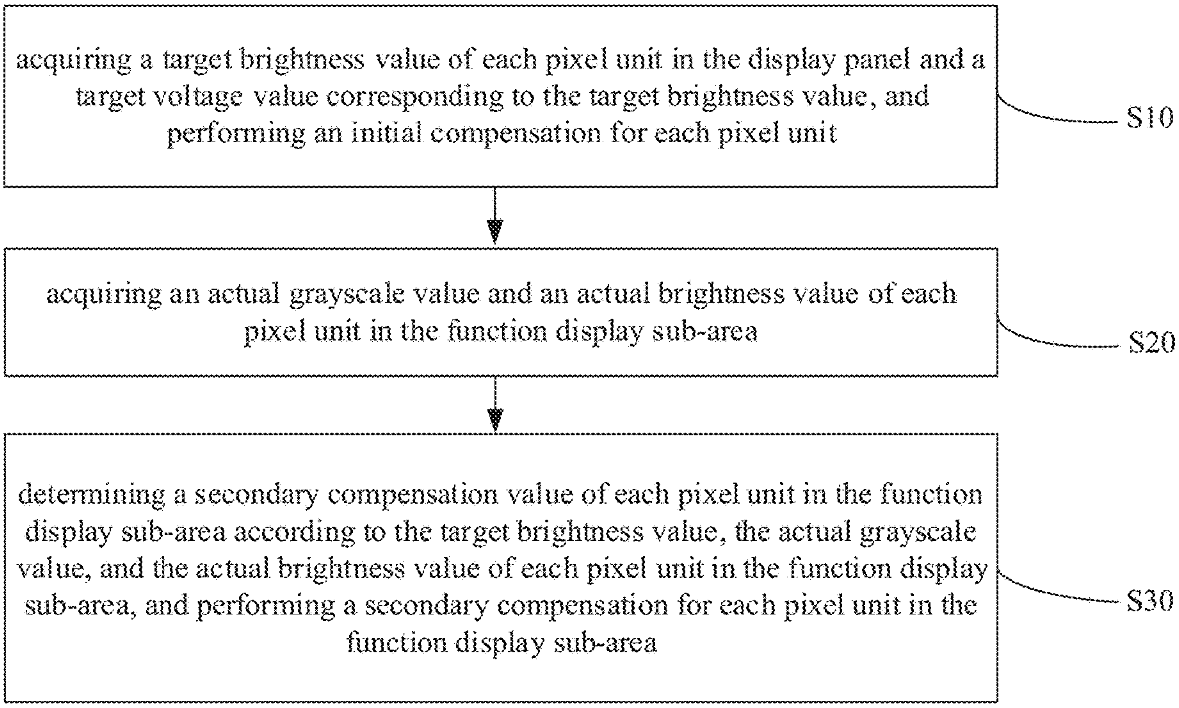
FIG. 1 is a flowchart of a mura compensation method of a display panel of an embodiment of the present disclosure.

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the scope of protection of the present disclosure.

The following disclosure provides many different embodiments or examples to realize the different structures of the present disclosure. In order to simplify the disclosure of the present disclosure, the components and settings of specific examples are described below. Apparently, they are only examples, and are not intended to limit the present disclosure. Furthermore, the present disclosure may repeat reference numerals and/or reference letters in different embodiments. This repetition is for the purpose of simplification and clarity, and does not indicate the relationship between the various embodiments and/or settings discussed. In addition, the present disclosure provides embodiments of various specific processes and materials, but those of ordinary skill in the art may be aware of the application of other processes and/or the use of other materials.

An embodiment of the present disclosure provides a mura compensation method of a display panel. The display panel includes a display area, the display area includes a regular display sub-area and a function display sub-area adjacent to the regular display sub-area. The mura compensation method of the display panel includes:

A target brightness value of each pixel unit in the display panel and a target voltage value corresponding to the target brightness value are acquired. An initial compensation for each pixel unit is performed.

An actual grayscale value and an actual brightness value of each pixel unit in the function display sub-area are acquired.

A secondary compensation value of each pixel unit in the function display sub-area is determined according to the target brightness value, the actual grayscale value, and the actual brightness value of each pixel unit in the function display sub-area. A secondary compensation for each pixel unit in the function display sub-area is performed.

It should be noted that in the embodiment of the present disclosure, the function display sub-area may be a photosensitive area, such as a camera area.

In the process of implementation and application, in the related art, driving circuits such as anode leads are arranged around the camera area. Lengths of the anode leads connecting the pixels at different positions are different and loads are also different. Furthermore, in a low-brightness condition, it is easy to cause display unevenness in the camera area of the display panel. In the embodiment of the present disclosure, the secondary compensation is performed on the function display sub-area to effectively improve the display unevenness in the function display sub-area, and to increase a display uniformity and display performance of the display panel.

Specifically, in the embodiment of the present disclosure, the display panel includes the display area. The display area includes the regular display sub-area for normal display and the function display sub-area that needs to improve light transmission. For example, the function display sub-area can be the camera area.

Figure 2:
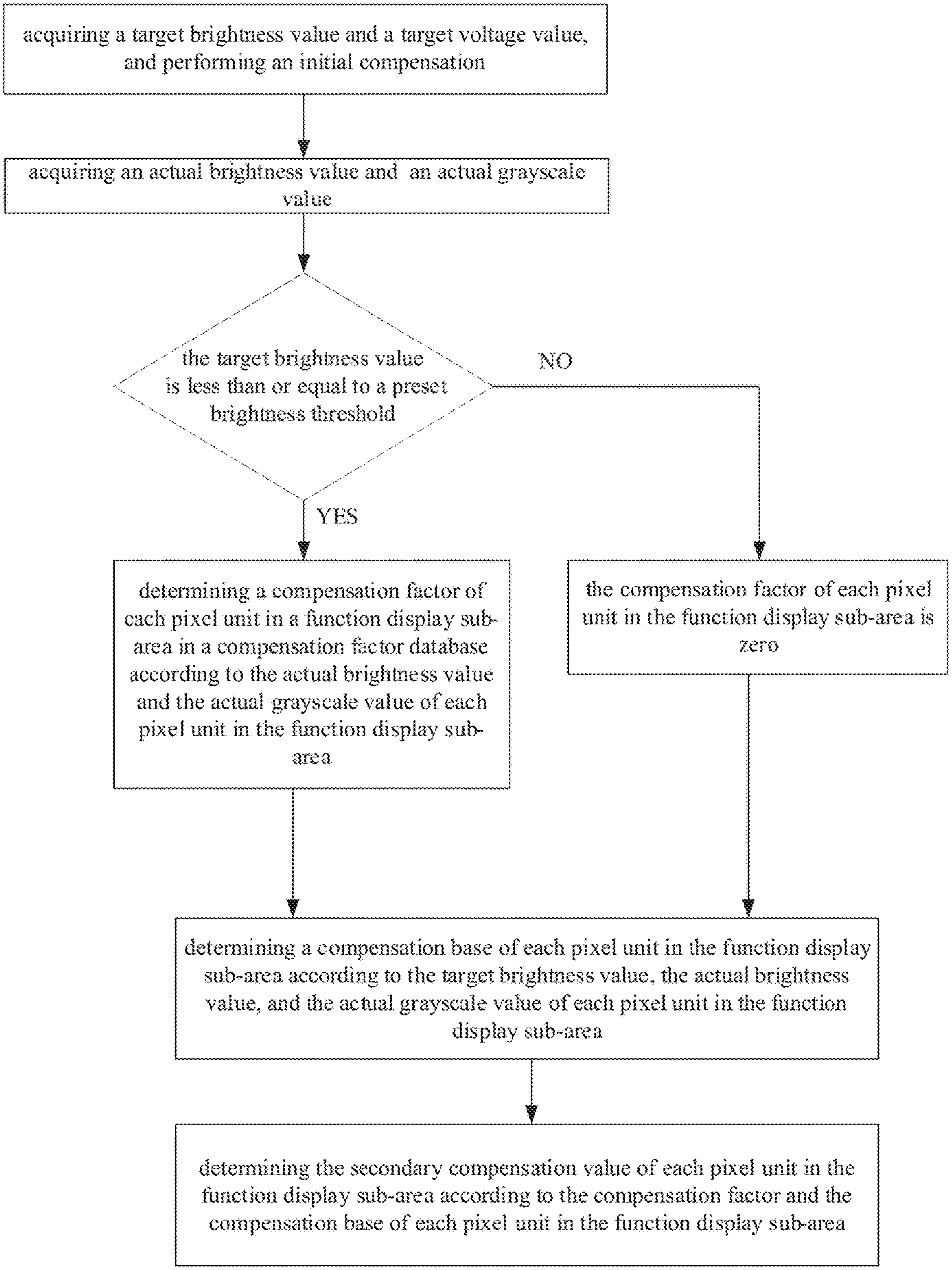
FIG. 2 is a logic diagram of a mura compensation method of a display panel of an embodiment of the present disclosure.

Furthermore, refer to FIG. 1 and FIG. 2, a mura compensation method of a display panel includes:

S10, a target brightness value of each pixel unit in the display panel and a target voltage value corresponding to the target brightness value are acquired. An initial compensation for each pixel unit is performed.

The target brightness value of the display panel and the target voltage value corresponding to the target brightness value are acquired. The target voltage value can be acquired according to a corresponding relationship between a voltage and a brightness in a gamma curve of the display panel. It can be understood that, in the subsequent embodiments, the brightness value obtained from the voltage value or the voltage value obtained from the brightness value can be obtained from the gamma curve of the display panel.

In addition, an initial voltage value received by the display panel and an initial brightness value corresponding to the initial voltage value need to be acquired. Single-color brightness data (i.e., the initial brightness value) corresponding to each color of three primary colors can be acquired by a camera, and then the initial compensation value of each pixel unit can be calculated according to the initial brightness value, the initial voltage value, the target brightness value, and the target voltage value. The number of the initial compensation values of the pixel units in the display panel is relatively large. In order to save storage space, the initial compensation values of some pixel units can be selected for storage. The compensation values in other pixel units can be calculated by linear interpolation to perform the initial compensation for each pixel unit in the display panel. It is understandable that the foregoing initial compensation process can be implemented with reference to a conventional process, and will not be repeated here.

S20, an actual grayscale value and an actual brightness value of each pixel unit in the function display sub-area are acquired.

After the initial compensation for each pixel unit in the display panel is performed, the actual grayscale value and the actual brightness value of each pixel unit in the function display sub-area are acquired. The actual brightness value of each pixel unit in the function display sub-area can be acquired through a device such as the camera.

S30, a secondary compensation value of each pixel unit in the function display sub-area is determined according to the target brightness value, the actual grayscale value, and the actual brightness value of each pixel unit in the function display sub-area, and a secondary compensation for each pixel unit in the function display sub-area is performed.

A compensation factor of each pixel unit in the function display sub-area is determined according to the target brightness value, the actual brightness value, and the actual grayscale value of each pixel unit in the function display sub-area.

If the target brightness value is less than or equal to a preset brightness threshold, it is determined that the display panel is in a first display mode.

The compensation factor of each pixel unit in the function display sub-area in a compensation factor database is determined according to the actual brightness value and the actual grayscale value of each pixel unit in the function display sub-area. The compensation factor database includes a plurality sets of optical parameters. One set of the optical parameters corresponds to one compensation factor.

Specifically, in the compensation factor database, each set of the optical parameters includes a reference brightness value and a reference grayscale value. A corresponding compensation factor is acquired according to the actual brightness value and the actual grayscale value of each pixel unit.

As shown in Table 1 below, which is a lookup table for the compensation factor database of the embodiment of the present disclosure. It should be noted that data in the following table is only used to illustrate the compensation process. By adjusting a sample display panel, a plurality of compensation factors are selected for compensation under different grayscale values and brightness values, so as to obtain the compensation factors under different grayscale values and corresponding brightness values.

TABLE 1 a lookup table for the compensation factor database

| brightness value | | 2 | 10 | 100 | 200 | . . . |
|---|---|---|---|---|---|---|
| grayscale value | 16 | 90 | 60 | 40 | 50 | . . . |
| | 48 | 100 | 50 | 36 | 40 | . . . |
| | 96 | 120 | 45 | 30 | 30 | . . . |
| | . . . | . . . | . . . | . . . | . . . | . . . |

For grayscale values and brightness values that are not selected during adjusting, linear interpolation can be used to calculate them.

For example, when acquiring a compensation factor when a brightness value is 80 nit and a grayscale value is 60 grayscale, a compensation factors corresponding to the 48 grayscale and 96 grayscale when the brightness value is 80 nit is first calculated:

The compensation factor corresponding to 48 grayscale is: (36-50)/(100-10)*(80-10)+50≈39.1;

The compensation factor corresponding to 96 grayscale is: (30-45)/(100-10)*(80-10)+45≈33.3.

Thus, the compensation factor corresponding to 60 grayscale is: (33.3-39.1)/(96-48)*(60-48)+39.1=37.65. From the above calculation process, it can be concluded that when the brightness value is 80 nit and the grayscale value is 60 grayscale, the corresponding compensation factor is 37.65.

It should be noted that in the embodiment of the present disclosure, in the first display mode, the target brightness value of each pixel unit is less than or equal to 200 nit. In other embodiments of the present disclosure, the actual brightness value of each pixel unit may also be used as a determining standard. Alternatively, a weighted value of the actual brightness value and the target brightness value is used as the determining standard, which is not limited here.

Alternatively, in the first display mode, the actual grayscale value of each pixel unit also needs to be less than or equal to 196 grayscale. Furthermore, the first display mode may be a PWM dimming mode.

If the target brightness value is greater than the preset brightness threshold, it is determined that the display panel is in a second display mode. That is, if the target brightness value is greater than 200 nit, the display panel is in the second display mode.

At this time, the compensation factor is zero.

Furthermore, a compensation base of each pixel unit in the function display sub-area is determined according to the target brightness value, the actual brightness value, and the actual grayscale value of each pixel unit in the function display sub-area.

A calculation formula of the compensation base of each pixel unit in the function display sub-area is:

$$N=\left(e^{\frac{1}{2.2}ln\frac{A}{B}}-1\right)C$$

N is the compensation base of each pixel unit in the function display sub-area, A is the target brightness value of each pixel unit in the function display sub-area, B is the actual brightness value of each pixel unit in the function display sub-area, and C is the actual grayscale value of each pixel unit in the function display sub-area.

Through the above calculation formula of the compensation base of each pixel unit, the compensation base of each pixel unit in the function display sub-area is obtained.

Finally, according to the compensation factor and the compensation base of each pixel unit in the function display sub-area, a compensation voltage value (i.e., the secondary compensation value) of each pixel unit in the function display sub-area is determined.

A calculation formula of the secondary compensation value of each pixel unit in the unction display sub-area is:

$$M=NX$$

M is the secondary compensation value of each pixel unit in the function display sub-area, N is the compensation base of each pixel unit in the function display sub-area, and X is the compensation factor of each pixel unit in the function display sub-area.

That is, the compensation factor of each pixel unit in the function display sub-area acquired in the above embodiment is multiplied by the compensation base to obtain the secondary compensation value of each pixel unit in the function display sub-area, and the secondary compensation for each pixel unit in the function display sub-area is performed.

It should be noted that in the embodiment of the present disclosure, in the first display mode, the compensation factor of each pixel unit can be calculated. In the second display mode, the compensation factor of each pixel unit is zero. That is, the mura compensation method of the display panel of the embodiment of the present disclosure can perform the secondary compensation according to the display mode of the display panel. The compensation is performed according to actual needs to improve the uneven display of the camera area in the low-brightness mode in related technologies.

In an embodiment of the present disclosure, one of multiple display panels can be selected as a sample. Then, the initial compensation value of each pixel unit in the display panel and the secondary compensation value of each pixel unit in the function display sub-area are acquired through the compensation method described in the above embodiment. The initial compensation value of each pixel unit in the display panel and the secondary compensation value of each pixel unit in the function display sub-area are written into a drive module of the display panel. The initial compensation value and the secondary compensation value acquired by calculating the sample can be used as certificate version compensation data and written into the drive modules of other display panels for performing the compensation.

In another embodiment of the present disclosure, for each display panel, the compensation method described in the above embodiment can be used to acquire the initial compensation value of each pixel unit in each display panel and the secondary compensation value of each pixel unit in the function display sub-area. The initial compensation value of each pixel unit in each display panel and the secondary compensation value of each pixel unit in the function display sub-area are written into the drive module of the display panel. That is, in this embodiment, each display panel acquires its respective compensation data and writes it into its drive module for performing the compensation.

In addition, in the embodiment of the present disclosure, the display panel receives initial display data including the initial voltage value of each pixel unit. Then, the written initial compensation value is used to perform the initial compensation on the initial voltage value of each pixel unit. Then, the display mode of the display panel is determined. If the display panel is in the first display mode, the secondary compensation value that has been written is used to perform the secondary compensation for each pixel unit in the function display sub-area.

Furthermore, if the display panel is in the second display mode, the secondary compensation value is zero.

After performing the initial compensation and the secondary compensation on the initial voltage value of each pixel unit, compensated data can be output for display.

Figure 3:
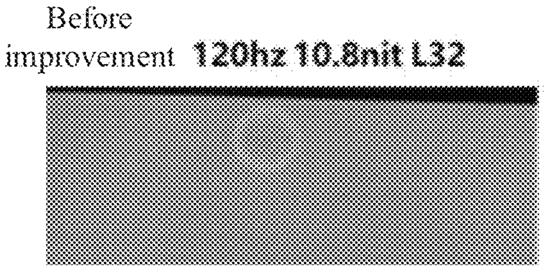
FIG. 3 is a schematic diagram showing an uneven display in a related technology.
Figure 4:
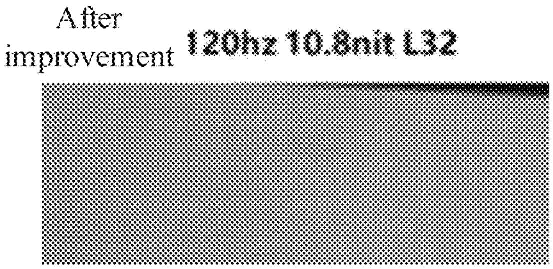
FIG. 4 is a schematic diagram showing a display of a display panel after being compensated of an embodiment of the present disclosure.

Accordingly, in the related art, driving circuits such as anode leads are arranged around the camera area. Lengths of the anode leads connecting the pixels at different positions are different and loads are also different, it is easy to cause display unevenness in the camera area of the display panel. As shown in FIG. 3, in the embodiment of the present disclosure, the secondary compensation is performed on the function display sub-area to effectively improve the display unevenness in the function display sub-area. As shown in FIG. 4, it indicates that the mura compensation method of the display panel of the embodiment of the present disclosure can effectively improve the display uniformity and display performance of the display panel. Under detection conditions of 120 Hz and 10.8 nit (L32), display images shown in FIG. 3 and FIG. 4 are obtained.

In addition, an embodiment of the present disclosure also provides a display panel. The display panel includes a display area. The display area includes a regular display sub-area and a function display sub-area adjacent to the regular display sub-area. It should be noted that in the embodiment of the present disclosure, the function display sub-area may be a photosensitive area, such as a camera area.

In the embodiment of the present disclosure, the function display sub-area includes a middle area and an annular bright area arranged around the middle area. The display panel also includes a first pixel unit disposed in the circular bright area and a second pixel unit disposed in the middle area.

It should be noted that in order to improve a light transmittance of the function display sub-area, transistors and other devices corresponding to the first pixel unit and the second pixel unit in the function display sub-area are all arranged outside the function display sub-area and can be arranged to surround the function display sub-area. The transistors and other devices outside the function display sub-area are connected to the first pixel unit and the second pixel unit in the function display sub-area through wirings, so voltages are applied to the first pixel unit and the second pixel unit to realize its light-emitting function.

During the display driving process, if a brightness of the first pixel unit is the same as a brightness of the second pixel unit, a driving voltage applied to the first pixel unit is higher than a driving voltage applied to the second pixel unit.

Alternatively, the driving voltage applied to the first pixel unit is greater than or equal to 1V and less than or equal to 6.8V. The driving voltage applied to the second pixel unit is greater than or equal to 1V and less than or equal to 6.8V.

The display panel of the embodiment of the present disclosure is compensated by the mura compensation method in the above embodiment to improve the display unevenness in the function display sub-area of the display panel, and increase the display uniformity and display performance of the display panel.

In the above-mentioned embodiments, the description of each embodiment has its own focus. For parts that are not described in detail in an embodiment, reference may be made to related descriptions of other embodiments.

The mura compensation method of the display panel and the display panel in the embodiment of the present disclosure are described in detail above. In this specification, specific examples are used to illustrate the principle and implementation of the present disclosure. The descriptions of the above embodiments are only used to help understand the technical solutions and core ideas of the present disclosure. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present disclosure.

What is claimed is:

1. A mura compensation method of a display panel, the display panel comprising a display area, the display area comprising a regular display sub-area and a function display sub-area adjacent to the regular display sub-area, and the mura compensation method of the display panel comprising:

acquiring a target brightness value of each pixel unit in the display panel and a target voltage value corresponding to the target brightness value, and performing an initial compensation for each pixel unit;

acquiring an actual grayscale value and an actual brightness value of each pixel unit in the function display sub-area; and determining a secondary compensation value of each pixel unit in the function display sub-area according to the target brightness value, the actual grayscale value, and the actual brightness value of each pixel unit in the function display sub-area, and performing a secondary compensation for each pixel unit in the function display sub-area, wherein the determination of the secondary compensation value of each pixel unit in the function display sub-area according to the target brightness value, the actual grayscale value, and the actual brightness value of each pixel unit in the function display sub-area, and performing of the secondary compensation for each pixel unit in the function display sub-area comprise:

determining a compensation factor of each pixel unit in the function display sub-area according to the target brightness value, the actual brightness value, and the actual grayscale value of each pixel unit in the function display sub-area;

determining a compensation base of each pixel unit in the function display sub-area according to the target brightness value, the actual brightness value, and the actual grayscale value of each pixel unit in the function display sub-area, wherein in the determination of the compensation base of each pixel unit in the function display sub-area according to the target brightness value, the actual brightness value, and the actual grayscale value of each pixel unit in the function display sub-area, a formula for determining the compensation base of each pixel unit in the function display sub-area according to the target brightness value, the actual brightness value, and the actual grayscale value of each pixel unit in the function display sub-area is:

$$N = \left(e^{\frac{1}{2.2}\ln\frac{A}{B}} - 1\right) C$$

wherein N is the compensation base of each pixel unit in the function display sub-area, A is the target brightness value of each pixel unit in the function display sub-area, B is the actual brightness value of each pixel unit in the function display sub-area, and C is the actual grayscale value of each pixel unit in the function display sub-area; and determining the secondary compensation value of each pixel unit in the function display sub-area according to the compensation factor and the compensation base of each pixel unit in the function display sub-area.

2. The mura compensation method of the display panel according to claim 1, wherein the step of determining the compensation factor of each pixel unit in the function display sub-area according to the target brightness value, the actual brightness value, and the actual grayscale value of each pixel unit in the function display sub-area comprises:

if the target brightness value is less than or equal to a preset brightness threshold, determining the compensation factor of each pixel unit in the function display sub-area in a compensation factor database according to the actual brightness value and the actual grayscale value of each pixel unit in the function display sub-area, wherein the compensation factor database comprises a plurality sets of optical parameters, and one of the sets of the optical parameters corresponds to one compensation factor.

3. The mura compensation method of the display panel according to claim 2, wherein the preset brightness threshold is 200 nit.

4. The mura compensation method of the display panel according to claim 2, wherein each set of the optical parameters comprises a preset brightness value and a preset grayscale value.

5. The mura compensation method of the display panel according to claim 2, wherein the step of determining the compensation factor of each pixel unit in the function display sub-area according to the target brightness value, the actual brightness value, and the actual grayscale value of each pixel unit in the function display sub-area further comprises:

if the target brightness value is greater than the preset brightness threshold, the compensation factor of each pixel unit in the function display sub-area is zero.

6. The mura compensation method of the display panel according to claim 5, wherein the preset brightness threshold is 200 nit.

7. The mura compensation method of the display panel according to claim 1, wherein in the step of determining the secondary compensation value of each pixel unit in the function display sub-area according to the compensation factor and the compensation base of each pixel unit in the function display sub-area, a formula for determining the secondary compensation value of each pixel unit in the function display sub-area according to the compensation factor and the compensation base of each pixel unit in the function display sub-area is:

$$M=NX$$

wherein M is the secondary compensation value of each pixel unit in the function display sub-area, N is the compensation base of each pixel unit in the function display sub-area, and X is the compensation factor of each pixel unit in the function display sub-area.

8. The mura compensation method of the display panel according to claim 1, wherein the steps of acquiring the target brightness value of each pixel unit in the display panel and the target voltage value corresponding to the target brightness value, and performing the initial compensation for each pixel unit comprise:

acquiring an initial voltage value of each pixel unit received by the display panel and an initial brightness value corresponding to the initial voltage value; and acquiring an initial compensation value of each pixel unit according to the initial voltage value, the initial brightness value, the target brightness value, and the target voltage value of each pixel unit in the display panel, and performing the initial compensation for each pixel unit.

9. A mura compensation method of a display panel, the display panel comprising a display area, the display area comprising a regular display sub-area and a function display sub-area adjacent to the regular display sub-area, and the mura compensation method of the display panel comprising:

acquiring a target brightness value of each pixel unit in the display panel and a target voltage value corresponding to the target brightness value, and performing an initial compensation for each pixel unit;

acquiring an actual grayscale value and an actual brightness value of each pixel unit in the function display sub-area; and determining a secondary compensation value of each pixel unit in the function display sub-area according to the target brightness value, the actual grayscale value, and the actual brightness value of each pixel unit in the function display sub-area, and performing a secondary compensation for each pixel unit in the function display sub-area;

wherein the step performing the secondary compensation for each pixel unit in the function display sub-area comprises steps of:

determining a compensation factor of each pixel unit in the function display sub-area according to the target brightness value, the actual brightness value, and the actual grayscale value of each pixel unit in the function display sub-area;

determining a compensation base of each pixel unit in the function display sub-area according to the target brightness value, the actual brightness value, and the actual grayscale value of each pixel unit in the function display sub-area, wherein in the determination of the compensation base of each pixel unit in the function display sub-area according to the target brightness value, the actual brightness value, and the actual grayscale value of each pixel unit in the function display sub-area, a formula for determining the compensation base of each pixel unit in the function display sub-area according to the target brightness value, the actual brightness value, and the actual grayscale value of each pixel unit in the function display sub-area is:

$$N=\left(e^{\frac{1}{2.2}\ln\frac{A}{B}}-1\right)C$$

wherein N is the compensation base of each pixel unit in the function display sub-area, A is the target brightness value of each pixel unit in the function display sub-area, B is the actual brightness value of each pixel unit in the function display sub-area, and C is the actual grayscale value of each pixel unit in the function display sub-area; and determining the secondary compensation value of each pixel unit in the function display sub-area according to the compensation factor and the compensation base of each pixel unit in the function display sub-area, wherein in the step of determining the secondary compensation value of each pixel unit in the function display sub-area according to the compensation factor and the compensation base of each pixel unit in the function display sub-area, a formula for determining the secondary compensation value of each pixel unit in the function display sub-area according to the compensation factor and the compensation base of each pixel unit in the function display sub-area is:

$$M=NX$$

wherein M is the secondary compensation value of each pixel unit in the function display sub-area, N is the compensation base of each pixel unit in the function display sub-area, and X is the compensation factor of each pixel unit in the function display sub-area.

10. The mura compensation method of the display panel according to claim 9, wherein the step of determining the compensation factor of each pixel unit in the function display sub-area according to the target brightness value, the actual brightness value, and the actual grayscale value of each pixel unit in the function display sub-area comprises:

if the target brightness value is less than or equal to a preset brightness threshold, determining the compensation factor of each pixel unit in the function display sub-area in a compensation factor database according to the actual brightness value and the actual grayscale value of each pixel unit in the function display sub-area, wherein the compensation factor database comprises a plurality sets of optical parameters, and one of the sets of the optical parameters corresponds to one compensation factor.

11. The mura compensation method of the display panel according to claim 10, wherein each set of the optical parameters comprises a preset brightness value and a preset grayscale value.

12. The mura compensation method of the display panel according to claim 10, wherein the step of determining the compensation factor of each pixel unit in the function display sub-area according to the target brightness value, the actual brightness value, and the actual grayscale value of each pixel unit in the function display sub-area further comprises:

if the target brightness value is greater than the preset brightness threshold, the compensation factor of each pixel unit in the function display sub-area is zero.

13. The mura compensation method of the display panel according to claim 12, wherein the preset brightness threshold is 200 nit.

14. The mura compensation method of the display panel according to claim 9, wherein the steps of acquiring the target brightness value of each pixel unit in the display panel and the target voltage value corresponding to the target brightness value, and performing the initial compensation for each pixel unit comprise:

acquiring an initial voltage value of each pixel unit received by the display panel and an initial brightness value corresponding to the initial voltage value; and acquiring an initial compensation value of each pixel unit according to the initial voltage value, the initial brightness value, the target brightness value, and the target voltage value of each pixel unit in the display panel, and performing the initial compensation for each pixel unit.

15. A display panel, comprising a display area, wherein the display area comprises a regular display sub-area and a function display sub-area adjacent to the regular display sub-area, the function display sub-area comprises a middle area and an annular bright area surrounding the middle area;

the display panel comprises a first pixel unit disposed in the annular bright area and a second pixel unit disposed in the middle area; and in response to a brightness of the first pixel unit being the same as a brightness of the second pixel unit, a driving voltage applied to the first pixel unit is higher than a driving voltage applied to the second pixel unit;

wherein the display panel is compensated by a mura compensation method of a display panel, comprising:

acquiring a target brightness value of each pixel unit in the display panel and a target voltage value corresponding to the target brightness value, and performing an initial compensation for each pixel unit;

acquiring an actual grayscale value and an actual brightness value of each pixel unit in the function display sub-area; and determining a secondary compensation value of each pixel unit in the function display sub-area according to the target brightness value, the actual grayscale value, and the actual brightness value of each pixel unit in the function display sub-area, and performing a secondary compensation for each pixel unit in the function display sub-area, wherein the determination of the secondary compensation value of each pixel unit in the function display sub-area according to the target brightness value, the actual grayscale value, and the actual brightness value of each pixel unit in the function display sub-area, and performing of the secondary compensation for each pixel unit in the function display sub-area comprise:

determining a compensation factor of each pixel unit in the function display sub-area according to the target brightness value, the actual brightness value, and the actual grayscale value of each pixel unit in the function display sub-area;

determining a compensation base of each pixel unit in the function display sub-area according to the target brightness value, the actual brightness value, and the actual grayscale value of each pixel unit in the function display sub-area, wherein in the determination of the compensation base of each pixel unit in the function display sub-area according to the target brightness value, the actual brightness value, and the actual grayscale value of each pixel unit in the function display sub-area, a formula for determining the compensation base of each pixel unit in the function display sub-area according to the target brightness value, the actual brightness value, and the actual grayscale value of each pixel unit in the function display sub-area is:

$$N = \left(e^{\frac{1}{2.2}\ln\frac{A}{B}} - 1\right) C$$

wherein N is the compensation base of each pixel unit in the function display sub-area, A is the target brightness value of each pixel unit in the function display sub-area, B is the actual brightness value of each pixel unit in the function display sub-area, and C is the actual grayscale value of each pixel unit in the function display sub-area; and determining the secondary compensation value of each pixel unit in the function display sub-area according to the compensation factor and the compensation base of each pixel unit in the function display sub-area.

16. The display panel according to claim 15, wherein the driving voltage applied to the first pixel unit is greater than or equal to 1V and less than or equal to 6.8V; and the driving voltage applied to the second pixel unit is greater than or equal to 1V and less than or equal to 6.8V.

* * * * *